Feb. 25, 1947.  J. I. HOPE  2,416,483
MILK CAN TRUCK
Filed Dec. 1, 1944
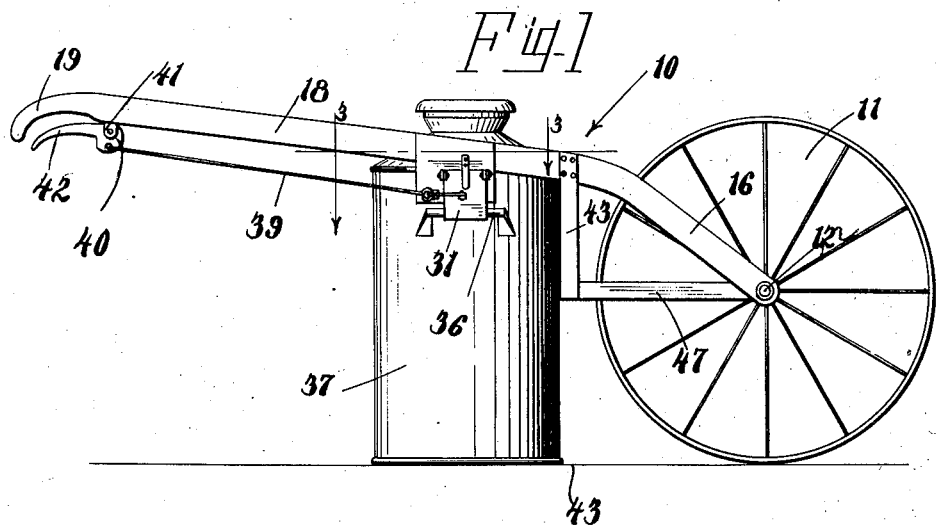
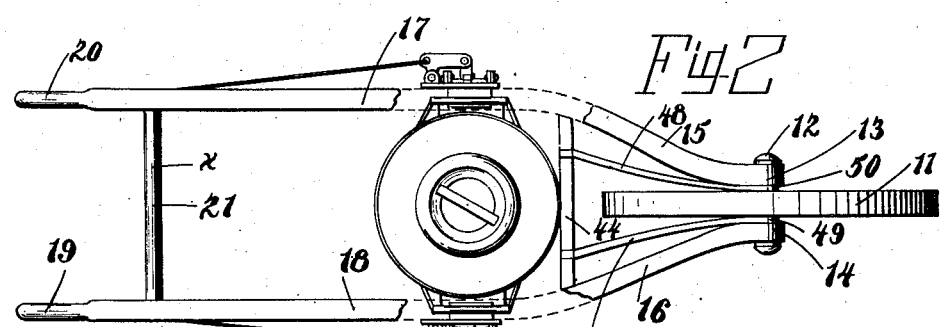
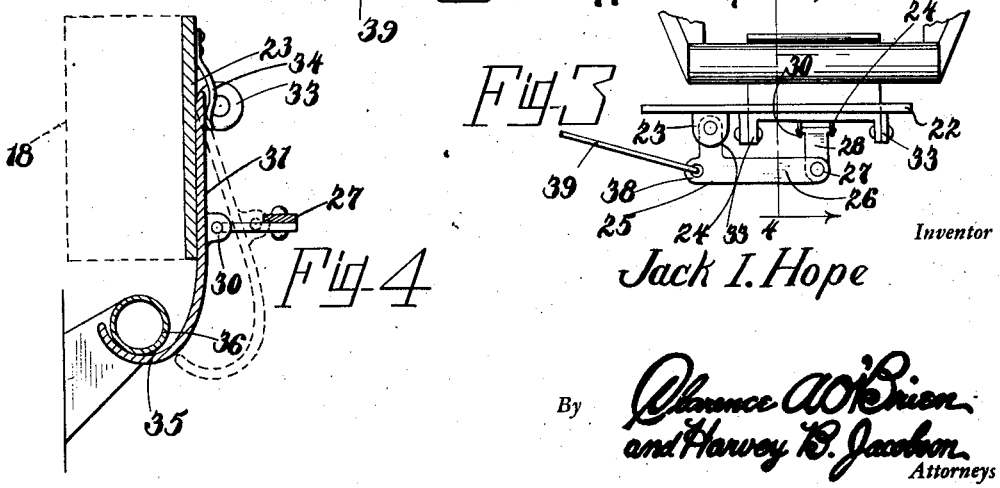
Inventor
Jack I. Hope Patented Feb. 25, 1947

2,416,483

UNITED STATES PATENT OFFICE 2,416,483

MILK CAN TRUCK

Jack I. Hope, Bellville, Ohio

Application December 1, 1944, Serial No. 566,201

2 Claims. (Cl. 214—65.4)

This invention relates to improvement in trucks and has for its object to provide a truck for carrying a large can of milk or other heavy liquid.

Another object of the invention is to provide a truck arranged to automatically engage a milk can or the like.

A further object of the invention is to provide a wheelbarrow like truck adapted to drop down over a milk can and automatically grip the handles of the can.

A still further object of the invention is to provide a milk can truck being so formed as to pick up, transport and release the can without manually contacting the same.

Other features and advantages will become more readily apparent from the following description and the accompanying illustrative drawings in which:

Figure 1 is a side elevational view of my truck,

Figure 2 is a top plan view thereof,

Figure 3 is an enlarged sectional view taken on line 3—3 of Figure 1, and

Figure 4 is a sectional view taken on line 4—4 of Figure 3.

Like reference characters indicate like parts throughout the accompanying drawings and in the following specification in which 10, indicates a milk can or other like package truck and which consists of a relatively large wheel 11, to the axle 12, of which is attached the terminals 13 and 14, of the inwardly turned portions 15 and 16, of the can supporting bars 17 and 18, which terminate at their free ends in hand-holds 19 and 20, said bars being connected by a brace 21.

Attached to the outer surfaces of said members 17, and 18, are identically formed can engaging devices, only one of which need be described in detail. Each of these members includes a supporting plate 22, having a projecting ear 23, to which is pivoted the arm 24, of a bell-crank lever 25, which is provided with an elongated arm 26, to the end 27, of which is pivoted a link 28, the inner end of which is pivotally connected to ears 29 and 30, fixed to the hook plates 21, pivotally connected at 32 and 33 to the plate 23. The member 31, is normally pressed in by a leaf spring 34, and the lower edge 35, is formed hook-shaped to engage around the handle 36, of a milk can 37.

Connected to the heel 38, of the lever 25, is a link rod 39, connected at its other end to a cam lever 40, pivoted at 41, adjacent to the hand-hold 19, whereby by pressing the lever extension 42, of member 40, toward element 19, the link 39, will be drawn forward to operate the bell-crank 25, whereby the member 28, will draw the element 35 from engagement with the handle 36, when the can 37, is seated upon a surface 43, and the members 17 and 18, slightly pressed down, whereby the can is released and it will only be necessary to raise the said members to move the truck from over the can. To take up the can, the disengaging operation is reversed, the members 42, being free, the members 35 will, being arcuate, be forced out by the handles 36, and then automatically grip said handles.

Attached to the members 17 and 18 are depending supports 43, to the lower ends of which is secured an arcuate bar 44, against which wall 45, of the can 37, rests, whereby the can will not swing while being moved. Braces 47 and 48, connect the member 44, to the axle 12, and seat between the wheel 11, and terminals 13 and 14, thus forming spacers at the terminals 49 and 50 to prevent the wheel 12, from wearing the elements 13 and 14.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having described my invention that which I claim to be new and desire to procure by Letters Patent is:

1. A truck comprising a pair of independent handlebars inclining down and converging toward one another at one end, a shaft connecting the free ends of said converging members, a pair of brace rods mounted on the shaft, a wheel on the shaft between said rods, a horizontal bar held below the handles to form a support and automatic means on the handles for engaging an article when the handles are dropped thereover, said means being spring actuated, means for releasing the first means against the tension of the spring action, said second means being automatic upon release of the grip ends of the handles.

2. A truck comprising a pair of independent handlebars inclining down and converging toward one another at one end, a shaft connecting the free ends of said converging members, a pair of brace rods mounted on the shaft, a wheel on the shaft between said rods, a horizontal bar held below the handles to form a support and automatic means on the handles for engaging an article when the handles are dropped thereover, said means being spring actuated, means for releasing the first means against the tension of the spring action.

JACK I. HOPE.

REFERENCES CITED

The following references are of record in the file of this patent:

UNITED STATES PATENTS

| Number | Name | Date |
|---|---|---|
| 2,081,504 | Quick | May 25, 1937 |
| 1,717,377 | Forry | June 18, 1929 |
| 978,344 | Wirt | Dec. 13, 1910 |
| 355,263 | Gourlay | Dec. 28, 1886 |
| 825,898 | Floyd | July 17, 1906 |
| 1,559,923 | West | Nov. 3, 1925 |
| 1,608,371 | Carroll | Nov. 23, 1926 |
| 809,003 | Mitchell | Jan. 2, 1906 |
| 183,395 | Hill | Oct. 17, 1876 |
| 2,381,858 | Austin | Aug. 14, 1945 |
| 2,262,345 | Shepherd | Nov. 11, 1941 |
| 2,377,845 | Westfall | June 5, 1945 |

FOREIGN PATENTS

| Number | Country | Date |
|---|---|---|
| 177,446 | Swiss | Aug. 16, 1935 |